United States Patent
Azzam et al.

(10) Patent No.: US 10,416,584 B2
(45) Date of Patent: Sep. 17, 2019

(54) ELECTROPHOTOGRAPHIC COMPOSITION

(71) Applicant: HP Indigo B.V., Amstelveen (NL)

(72) Inventors: Tony Azzam, Nazareth (IL); Tehila Ben-Ezra, Nes Ziona (IL); Regina Guslitzer, Nes Ziona (IL); Reut Avigdor, Nes Ziona (IL); Samer Farran, Nes Ziona (IL); Yaron Grinwald, Meitar (IL); Roy Har-Tsvi, Kiryat Motzkin (IL); Eyal Shelef, Tel-Aviv (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 16/072,446

(22) PCT Filed: Mar. 4, 2016

(86) PCT No.: PCT/EP2016/054702
§ 371 (c)(1),
(2) Date: Jul. 24, 2018

(87) PCT Pub. No.: WO2017/148538
PCT Pub. Date: Sep. 8, 2017

(65) Prior Publication Data
US 2019/0033743 A1   Jan. 31, 2019

(51) Int. Cl.
*G03G 9/00* (2006.01)
*G03G 9/13* (2006.01)
(Continued)

(52) U.S. Cl.
CPC .............. *G03G 9/131* (2013.01); *C09D 11/02* (2013.01); *C09D 11/03* (2013.01); *C09D 11/106* (2013.01);
(Continued)

(58) Field of Classification Search
CPC ....................................................... G03G 9/131
(Continued)

(56) References Cited

U.S. PATENT DOCUMENTS 5,125,996 A   6/1992  Campbell et al.
6,165,667 A   12/2000  Takagi et al.
(Continued)

FOREIGN PATENT DOCUMENTS

BE   1009847     10/1997
BR   PI1001075   11/2011
(Continued)

OTHER PUBLICATIONS

Expancel® Microspheres the multi-performance Additive; AkzoNobel, 2013 https://www.akzonobel.com/expancel/system/Images/AkzoNobel_Expancel_the_multiperformance_additive_tcm6.
(Continued)

*Primary Examiner* — Mark A Chapman
(74) *Attorney, Agent, or Firm* — Dierker & Kavanaugh PC

(57) ABSTRACT

This disclosure relates to a liquid electrophotographic composition comprising a thermoplastic polymer resin, a charge adjuvant, microspheres, and a liquid carrier. Each microsphere comprises a shell of material encapsulating a gas. The microspheres are present in an amount of 5 to 90 weight % of the total weight of solids in the composition.

15 Claims, 1 Drawing Sheet

(a)

Heating →

(b)

(51) Int. Cl.
  *C09D 11/02* (2014.01)
  *C09D 11/03* (2014.01)
  *C09D 11/106* (2014.01)
  *G03G 9/12* (2006.01)
  *G03G 9/135* (2006.01)
  *G03G 13/10* (2006.01)
(52) U.S. Cl.
  CPC ............... *G03G 9/00* (2013.01); *G03G 9/12* (2013.01); *G03G 9/135* (2013.01); *G03G 9/1355* (2013.01); *G03G 13/10* (2013.01)
(58) Field of Classification Search
  USPC ........................................................ 430/114
  See application file for complete search history.

(56) References Cited

U.S. PATENT DOCUMENTS 6,340,519 B1  1/2002  Tanaka et al.
8,870,367 B2  10/2014  Delmerico
2010/0073408 A1*  3/2010  Hale ..................... B41J 2/315
                                                                    347/5
2014/0131367 A1  5/2014  Bordary et al.

FOREIGN PATENT DOCUMENTS

| CN | 204123724 | 1/2015 |
| GB | 1442823 | 7/1976 |
| WO | WO-2012105952 | 8/2012 |
| WO | WO-2014015890 | 1/2014 |

OTHER PUBLICATIONS

International Search Report and Written Opinion for International Publication No. PCT/EP2016/054702 dated Nov. 14, 2016, 9 pages.

* cited by examiner

ELECTROPHOTOGRAPHIC COMPOSITION

BACKGROUND

An electrophotographic printing process involves creating an image on a photoconductive surface or photo imaging plate (PIP). The image that is formed on the photoconductive surface is a latent electrostatic image having image and background areas with different potentials. When an electrophotographic ink composition containing charged ink particles is brought into contact with the selectively charged photoconductive surface, the charged ink particles adhere to the image areas of the latent image while the background areas remain clean. The image is then transferred to a print substrate (e.g. paper) either directly or by first being transferred to an intermediate transfer member (e.g. a soft swelling blanket) and then to the print substrate.

BRIEF DESCRIPTION OF THE DRAWINGS

Various implementations are described, by way of example, with reference to the accompanying drawings, in which.

DETAILED DESCRIPTION

Figure 1:
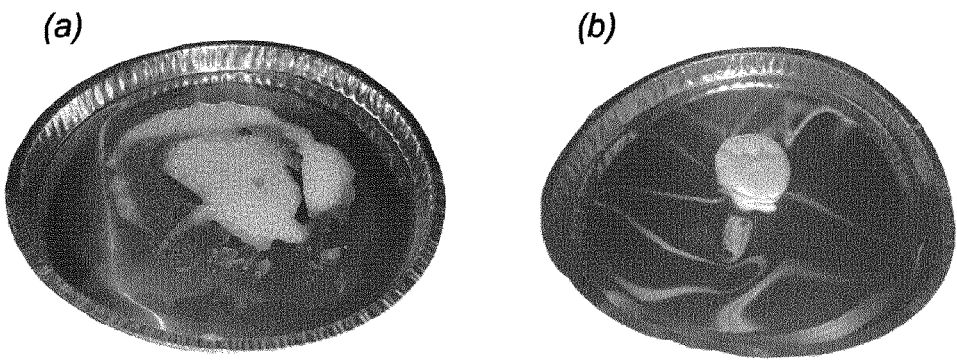
FIGS. 1a and 1b are photographs showing, respectively, a substrate printed with a transparent electrophotographic composition that is devoid of microspheres and a substrate printed with a transparent electrophotographic composition containing microspheres.

Before the present disclosure is described, it is to be understood that this disclosure is not limited to the particular process steps and materials disclosed in this description because such process steps and materials may vary. It is also to be understood that the terminology used in this disclosure is used for the purpose of describing particular examples. The terms are not intended to be limiting.

It is noted that, as used in this specification and the appended claims, the singular forms "a," "an," and "the" include plural referents unless the context clearly dictates otherwise.

As used in this disclosure, "co-polymer" refers to a polymer that is polymerized from at least two monomers. The term "terpolymer" refers to a polymer that is polymerized from 3 monomers.

As used in this disclosure, "melt index" and "melt flow rate" are used interchangeably. The "melt index" or "melt flow rate" refers to the extrusion rate of a resin through an orifice of defined dimensions at a specified temperature and load, reported as temperature/load, e.g. 190° C./2.16 kg. In the present disclosure, "melt flow rate" or "melt index" is measured per ASTM D1238-04c Standard Test Method for Melt Flow Rates of Thermoplastics by Extrusion Plastometer. If a melt flow rate of a particular polymer is specified, unless otherwise stated, it is the melt flow rate for that polymer alone, in the absence of any of the other components of the electrophotographic or electrostatic composition.

As used in this disclosure, "acidity," "acid number," or "acid value" refers to the mass of potassium hydroxide (KOH) in milligrams that neutralizes one gram of a substance. The acidity of a polymer can be measured according to standard techniques, for example as described in ASTM D1386. If the acidity of a particular polymer is specified, unless otherwise stated, it is the acidity for that polymer alone, in the absence of any of the other components of the liquid toner composition.

As used in this disclosure, "melt viscosity" generally refers to the ratio of shear stress to shear rate at a given shear stress or shear rate. Testing may be performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @ 140° C., units are mPa-s or cPoise, as known in the art. Alternatively, the melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate. If the melt viscosity of a particular polymer is specified, unless otherwise stated, it is the melt viscosity for that polymer alone, in the absence of any of the other components of the electrostatic or electrophotographic composition.

A polymer may be described as comprising a certain weight percentage of monomer. This weight percentage is indicative of the repeating units formed from that monomer in the polymer.

If a standard test is mentioned in this disclosure, unless otherwise stated, the version of the test to be referred to is the most recent at the time of filing this patent application.

As used in this disclosure, "electrostatic" or "electrophotographic" are used interchangeably. An "electrostatic" or "electrophotographic" printing process refers to a process that provides an image that is transferred from a photoconductive surface or photo imaging plate either directly or indirectly via an intermediate transfer member to a print substrate. As such, the image may not be substantially absorbed into the photo imaging substrate on which it is applied. Additionally, "electrophotographic printers" or "electrostatic printers" refer to those printers capable of performing electrophotographic printing or electrostatic printing, as described above. An electrophotographic printing process may involve subjecting the electrophotographic composition to an electric field, e.g. an electric field having a field gradient of 1-400V/μm, or more, in some examples 600-900V/μm, or more.

As used in this disclosure, the term "about" is used to provide flexibility to a numerical value or range endpoint by providing that a given value may be a little above or a little below the endpoint to allow for variation in test methods or apparatus. The degree of flexibility of this term can be dictated by the particular variable and would be within the knowledge of those skilled in the art to determine based on experience and the associated description in this disclosure.

As used in this disclosure, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used in this disclosure, the "average particle diameter" of the microspheres can be determined by light scattering. In some instances, the particle size may be measured using laser diffraction or Low Angle Laser Light Scattering (LALLS). In some examples, the median value of the volume distribution, Dv(0.5) may be used to characterize microsphere size. Where commercially available microspheres are used (e.g. those available under the Exapancel® trademark [Akzo Nobel®]), the microspheres may be supplied with specific average particle diameters.

Concentrations, amounts, and other numerical data may be expressed or presented in this disclosure in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5. This same principle applies to ranges reciting a single numerical value. Furthermore, such an interpretation should apply regardless of the breadth of the range or the characteristics being described.

The present disclosure relates to a liquid electrophotographic composition comprising a thermoplastic polymer resin, a charge adjuvant, microspheres, and a liquid carrier. Each microsphere comprises a shell of material encapsulating a gas. The microspheres are present in an amount of 5 to 90 weight % of the total weight of solids in the composition.

The present disclosure also relates to an electrophotographic printing method comprising electrophotographically printing a liquid electrophotographic composition onto a substrate to form a printed image. The composition comprises a thermoplastic polymer resin, a charge adjuvant, a charge director, microspheres, and a liquid carrier. Each microsphere comprises a shell of material encapsulating a gas. The microspheres are present in an amount of 5 to 90 weight % of the total weight of solids in the composition.

The present disclosure also relates to a method of producing a liquid electrophotographic composition. The method comprises incorporating microspheres into a composition comprising a thermoplastic polymer resin, a charge adjuvant, and a liquid carrier. The microspheres each comprise a shell of material encapsulating a gas. The microsphere are present in an amount of 5 to 90 weight % of the total weight of solids in the composition.

The microspheres in the liquid electrophotographic ink of the present invention may provide printed substrates with a raised or 3-D look and/or feel. This can have many applications, for example, in the printing of articles such as packaging, fabric (T-shirts and textiles), wallpaper, signs and labels. The microspheres may also be used to print raised text and braille.

The present inventors have found that microspheres can be incorporated into liquid electrophotographic ink compositions that are digitally printed onto substrates. This is surprising because microspheres are not known to be chargeable under electrophotographic printing conditions. Furthermore, the microspheres cannot be ground with other toner components to improve their charging characteristics, as grinding would damage the microspheres' 3-D appeal. That microspheres can be incorporated into a liquid electrophotographic composition to provide a 3-D effect, therefore, would have been unexpected to a skilled person.

In some examples, the microspheres may be expandable microspheres that expand when the microspheres are heated beyond a threshold temperature. In some examples, the microspheres may be printed onto a substrate in an unexpanded state. The printed substrate may be heated subsequently in order to expand the microspheres.

The present inventors have also found that, by using expandable microspheres according to examples of the present disclosure, it is possible to produce a liquid electrophotographic composition that can be printed while the microspheres are in an unexpanded state. Microspheres that have a relatively small size may be more easily dispersed in the liquid carrier. They may also be less likely to adversely affect the electrophotographic printing process. In one example, the microspheres may have an average particle diameter of 20 µm or less in an unexpanded state. These microspheres may be printed in an unexpanded state. Once printed, the substrate may be heated to cause the microspheres to expand. In one example, the volume of the microspheres may expand more than 10 times, for example, more than 40 times. In an expanded state, the microspheres may provide the printed image with height or "loft".

The liquid electrophotographic composition may comprise an admixture comprising the microspheres and particles comprising the thermoplastic polymer resin. However, in some examples, the liquid electrophotographic composition particles comprising the microspheres are at least partially coated with the thermoplastic polymer resin. This may be achieved by dispersing the microspheres in molten or softened thermoplastic resin, and allowing the molten or softened thermoplastic resin to cool and coat the microspheres.

The present inventors have found that, by at least partially coating the microspheres, it is possible to enhance the intimacy of contact between the thermoplastic polymer resin and the microspheres. This allows more microspheres to be loaded in the liquid electrophotographic composition without loss of electrophotographic printing efficacy. In some examples, the microspheres are present at a concentration of greater than 10 weight %, for example, 15 to 90 weight % of the total weight of solids in the electrophotographic composition. Higher microsphere loadings may also allow the desired loft to be achieved in a fewer number of passes. Surprisingly, the present inventors have found that, even when the microspheres are coated by the thermoplastic resin, the microspheres expand upon heating above a threshold temperature. Thus, expansion of the microspheres may not be significantly affected by the additional thermoplastic polymer resin layer surrounding the microsphere shell.

Microspheres

The microspheres employed in the liquid electrophotographic composition may be expanded or unexpanded microspheres. The microspheres each comprise a shell encapsulating a gas. The gas may be air, carbon dioxide or a hydrocarbon gas. In some examples, the gas is an alkane, for example, methane, ethane, propane and butane.

The shell may be formed of any suitable material. For example, the shell may be formed of a polymer, for example, a thermoplastic polymer. In one example, the polymer is a polyethylene. Another example of polymer is poly(acrylonitrile-co-vinylidene chloride-co-methyl methacrylate. Other examples include Poly(methyl methacrylate)

(PMMA), Acrylonitrile butadiene styrene (ABS), poly(lactic acid) (PLA), polycarbonate (PC), polyethyer ether ketone (PEEK), polypropylene (PP), polystyrene (PS) and polyvinyl chloride (PVC).

In some examples, the microspheres are expandable microspheres. Such microspheres expand when heated above a threshold temperature. When the microspheres are heated above the threshold temperature, the shell (e.g. polymer shell) softens and, at the same time, the pressure of the gas inside the shell increases. This causes the shell to stretch and expand. When heat is removed, the shell may stiffen and the microsphere may remain in its expanded form. When fully expanded, the volume of the microspheres increases more than 5 times, for example, more than 10 times. In some examples, the volume increases by more than 20 times, for instance, more than 30 or 40 times.

As described above, expandable microspheres may be incorporated into the electrophotographic composition in unexpanded form. The composition may be printed at temperatures below the threshold temperature. Accordingly, the microspheres may remain unexpanded during the printing process. Once printed, however, the printed substrate may be heated to temperatures above the threshold temperature. This causes the microspheres to expand, providing the printed image with a raised or 3-D effect. It is possible to heat only selected parts of the image to create loft in selected parts of the printed image.

The threshold temperature of the microspheres may be 60 degrees C. or above, for example, 70 degrees C. or above. In some examples, the threshold temperature may be 80 degrees C. or above. In one example, the threshold temperature may be 60 to 140 degrees C., for instance, 70 to 120 degrees C. In another example, the threshold temperature may be 75 to 100 degrees C., for instance, 80 to 90 degrees C.

The microspheres may be any suitable size. For example, the microspheres suspended or dispersed in the liquid electrophotographic ink composition may have an average diameter of 3 to 40 µm, for instance, 5 to 30 µm. In some examples, the average diameter may be 20 µm or less, for instance, 16 µm or less. In some examples, the average diameter is 5 to 16 µm (e.g. 9 to 15 µm). In the case of expandable microspheres, the unexpanded microspheres may have an average diameter of 3 to 40 µm, for instance, 5 to 30 µm. In some examples, the average diameter may be 20 µm or less, for instance, 16 µm or less. In some examples, the average diameter is 5 to 16 µm (e.g. 9 to 15 µm).

In one example, the microspheres are expandable microspheres comprising a polymer shell encasing a hydrocarbon gas. Examples of suitable microspheres are sold under the trademark Expancel® by Boud Minerals (UK). Suitable grades include 461 DU 40 (PS 9-15 µm, Tstart=98-104° C.), 551 DU 40 (PS 10-16 µm, Tstart=95-100° C.), 461 DU 20 (PS 6-9 µm, Tstart=100-106° C.), 051 DU 40 (PS 9-15 µm, Tstart=108-113° C.), 031 DU 40 (PS 10-16 µm, Tstart=80-95° C.), 053 DU 40 (PS 10-16 µm, Tstart=96-103° C.), and 920 DU 40 (PS 10-16 µm, Tstart=123-133° C.). Suitable grades of expanded microspheres available under the Expancel® trademark include 551 DE 40 d42, 461 DE 20 d70, 461 DE 40 d60, 461 DET 40 d25, 920 DE 40 d30, and 920 DET 40 d25.

The microspheres are present at a concentration of 5 to 90 weight % of the total weight of solids in the composition. In some examples, the microspheres are present at a concentration of greater than 10 weight %, for example, 15 to 90 weight % of the total weight of solids in the electrophotographic composition. In one example, the microspheres are present in an amount of 15 to 70 weight %, for example, 20 to 50 weight % of the total weight of solids in the electrophotographic composition.

It may be possible to use more than one type of microsphere in the liquid electrophotographic composition. For example, it may be possible to incorporate expanded and expandable microspheres to create different areas of loft in the printed image. Similarly, it may be possible to use microspheres having different (e.g. expanded) sizes.

Thermoplastic Resin

As described above, the electrophotographic composition comprises a thermoplastic polymer resin.

In some examples, the thermoplastic resin may be a polymer selected from ethylene or propylene acrylic acid co-polymers; ethylene or propylene methacrylic acid co-polymers; ethylene vinyl acetate co-polymers; co-polymers of ethylene or propylene (e.g. 80 wt % to 99.9 wt %) and alkyl (e.g. C1 to C5) esters of methacrylic or acrylic acid (e.g. 0.1 wt % to 20 wt %); co-polymers of ethylene (e.g. 80 wt % to 99.9 wt %), acrylic or methacrylic acid (e.g. 0.1 wt % to 20.0 wt %) and alkyl (e.g. C1 to C5) esters of methacrylic or acrylic acid (e.g. 0.1 wt % to 20 wt %); co-polymers of ethylene or propylene (e.g. 70 wt % to 99.9 wt %) and maleic anhydride (e.g. 0.1 wt % to 30 wt %); polyethylene; polystyrene; isotactic polypropylene (crystalline); co-polymers of ethylene and ethyl acrylate; polyesters; polyvinyl toluene; polyamides; styrene/butadiene co-polymers; epoxy resins; acrylic resins (e.g. co-polymer of acrylic or methacrylic acid and at least one alkyl ester of acrylic or methacrylic acid wherein alkyl may have from 1 to about 20 carbon atoms, such as methyl methacrylate (e.g. 50% to 90%)/methacrylic acid (e.g. 0 wt % to 20 wt %)/ethylhexylacrylate (e.g. 10 wt % to 50 wt %)); ethylene-acrylate terpolymers:ethylene-acrylic esters-maleic anhydride (MAH) or glycidyl methacrylate (GMA) terpolymers; ethylene-acrylic acid ionomers and combinations thereof.

The resin may comprise a polymer having acidic side groups. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The resin may comprise a polymer, in some examples a polymer having acidic side groups, that has a melt flow rate of less than about 70 g/10 minutes, in some examples about 60 g/10 minutes or less, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of, in some examples, about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers which are at least partially neutralized with metal ions (e.g. Zn, Na, Li) such as SURLYN® ionomers. The polymer comprising acidic side groups can be a co-polymer of ethylene and an ethylenically unsaturated acid of either acrylic or methacrylic acid, where the ethylenically unsaturated acid of either acrylic or methacrylic acid constitute from 5 wt % to about 25 wt % of the co-polymer, in some examples from 10 wt % to about 20 wt % of the co-polymer.

The resin may comprise two different polymers having acidic side groups. The two polymers having acidic side groups may have different acidities, which may fall within the ranges mentioned above. The resin may comprise a first polymer having acidic side groups that has an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has an acidity of 110 mg KOH/g to 130 mg KOH/g.

The resin may comprise two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The ratio of the first polymer having acidic side groups to the second polymer having acidic side groups can be from about 10:1 to about 2:1. The ratio can be from about 6:1 to about 3:1, in some examples about 4:1.

The resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may comprise a first polymer having a melt viscosity of 15000 poise or more, in some examples 20000 poise or more, in some examples 50000 poise or more, in some examples 70000 poise or more; and in some examples, the resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 or AC-5180 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

If the resin in the electrophotographic composition comprises a single type of polymer, the polymer (excluding any other components of the electrostatic composition) may have a melt viscosity of 6000 poise or more, in some examples a melt viscosity of 8000 poise or more, in some examples a melt viscosity of 10000 poise or more, in some examples a melt viscosity of 12000 poise or more. If the resin comprises a plurality of polymers all the polymers of the resin may together form a mixture (excluding any other components of the electrostatic composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

The resin may comprise two different polymers having acidic side groups that are selected from co-polymers of ethylene and an ethylenically unsaturated acid of either acrylic acid or methacrylic acid; or ionomers thereof, such as methacrylic acid and ethylene-acrylic or methacrylic acid co-polymers which are at least partially neutralized with metal ions (e.g. Zn, Na, Li) such as SURLYN® ionomers. The resin may comprise (i) a first polymer that is a co-polymer of ethylene and an ethylenically unsaturated acid of either acrylic acid and methacrylic acid, wherein the ethylenically unsaturated acid of either acrylic or methacrylic acid constitutes from 8 wt % to about 16 wt % of the co-polymer, in some examples 10 wt % to 16 wt % of the co-polymer; and (ii) a second polymer that is a co-polymer of ethylene and an ethylenically unsaturated acid of either acrylic acid and methacrylic acid, wherein the ethylenically unsaturated acid of either acrylic or methacrylic acid constitutes from 12 wt % to about 30 wt % of the co-polymer, in some examples from 14 wt % to about 20 wt % of the co-polymer, in some examples from 16 wt % to about 20 wt % of the co-polymer in some examples from 17 wt % to 19 wt % of the co-polymer.

The resin may comprise a polymer having acidic side groups, as described above (which may be free of ester side groups), and a polymer having ester side groups. The polymer having ester side groups may be a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1% to 50% by weight of the co-polymer, in some examples 5% to 40% by weight, in some examples 5% to 20% by weight of the co-polymer, in some examples 5% to 15% by weight of the co-polymer. The second monomer may constitute 1% to 50% by weight of the co-polymer, in some examples 5% to 40% by weight of the co-polymer, in some examples 5% to 20% by weight of the co-polymer, in some examples 5% to 15% by weight of the co-polymer. The first monomer can constitute 5% to 40% by weight of the co-polymer, the second monomer constitutes 5% to 40% by weight of the co-polymer, and with the third monomer constituting the remaining weight of the co-polymer. In some examples, the first monomer constitutes 5% to 15% by weight of the co-polymer, the second monomer constitutes 5% to 15% by weight of the co-polymer, with the third monomer constituting the remaining weight of the co-polymer. In some examples, the first monomer constitutes 8% to 12% by weight of the co-polymer, the second monomer constitutes 8% to 12% by weight of the co-polymer, with the third monomer constituting the remaining weight of the co-polymer. In some examples, the first monomer constitutes about 10% by weight of the co-polymer, the second monomer constitutes about 10% by weight of the co-polymer, and with the third monomer constituting the remaining weight of the co-polymer. The polymer may be selected from the Bynel® class of monomer, including Bynel 2022 and Bynel 2002, which are available from DuPont®.

The polymer having ester side groups may constitute 1% or more by weight of the total amount of the resin polymers, e.g. thermoplastic resin polymers, in the liquid electrophotographic composition, e.g. the total amount of the polymer or polymers having acidic side groups and polymer having ester side groups. The polymer having ester side groups may constitute 5% or more by weight of the total amount of the resin polymers, e.g. thermoplastic resin polymers, in some examples 8% or more by weight of the total amount of the resin polymers, e.g. thermoplastic resin polymers, in some examples 10% or more by weight of the total amount of the resin polymers, e.g. thermoplastic resin polymers, in some examples 15% or more by weight of the total amount of the resin polymers, e.g. thermoplastic resin polymers, in some examples 20% or more by weight of the total amount of the resin polymers, e.g. thermoplastic resin polymers, in some examples 25% or more by weight of the total amount of the resin polymers, e.g. thermoplastic resin polymers, in some examples 30% or more by weight of the total amount of the resin polymers, e.g. thermoplastic resin polymers, in some examples 35% or more by weight of the total amount of the resin polymers, e.g. thermoplastic resin polymers, in the liquid electrophotographic composition. The polymer having ester side groups may constitute from 5% to 50% by weight of the total amount of the resin polymers, e.g. thermoplastic resin polymers, in the liquid electrophotographic composition, in some examples 10% to 40% by weight of the total amount of the resin polymers, e.g. thermoplastic resin polymers, in the liquid electrophotographic composition, in some examples 5% to 30% by weight of the total amount of the resin polymers, e.g. thermoplastic resin polymers, in the liquid electrophotographic composition, in some examples 5% to 15% by weight of the total amount of the resin polymers, e.g. thermoplastic resin polymers, in the liquid electrophotographic composition in some examples 15% to 30% by weight of the total amount of the resin polymers, e.g. thermoplastic resin polymers, in the liquid electrophotographic composition.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

The polymer, polymers, co-polymer or co-polymers of the resin can in some examples be selected from the Nucrel family of toners (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, Bynell 2020 and Bynell 2022, (sold by E. I. du PONT)), the Aclyn family of toners (e.g. Aclyn 201, Aclyn 246, Aclyn 285, and Aclyn 295), and the Lotader family of toners (e.g. Lotader 2210, Lotader, 3430, and Lotader 8200 (sold by Arkema)).

The resin can constitute about 5 to 90%, in some examples about 50 to 80%, by weight of the solids of the liquid electrophotographic composition. The resin can constitute about 60 to 95%, in some examples about 70 to 95%, by weight of the solids of the liquid electrophotographic composition.

Charge Adjuvant

The electrophotographic composition includes a charge adjuvant. A charge adjuvant may be present with a charge director, and may be different to the charge director, and act to increase and/or stabilise the charge on particles, e.g. resin-containing particles, of an electrostatic composition. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Cu salts of stearic acid, Fe salts of stearic acid, metal carboxylates (e.g. Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock co-polymers of 2-ethylhexyl methacrylate-co-methacrylic acid calcium, and ammonium salts, co-polymers of an alkyl acrylamidoglycolate alkyl ether (e.g. methyl acrylamidoglycolate methyl ether-co-vinyl acetate), and hydroxy bis(3,5-di-tert-butyl salicylic) aluminate monohydrate. In some examples, the charge adjuvant is aluminium di and/or tristearate and/or aluminium di and/or tripalmitate.

The charge adjuvant can constitute about 0.1 to 5% by weight of the solids of the liquid electrophotographic composition. The charge adjuvant can constitute about 0.5 to 4% by weight of the solids of the liquid electrophotographic composition. The charge adjuvant can constitute about 1 to 3% by weight of the solids of the liquid electrophotographic composition.

Charge Director

A charge director may be added to the electrophotographic composition. In some examples, the charge director comprises nanoparticles of a simple salt and a salt of the general formula $MA_n$, wherein M is a barium, n is 2, and A is an ion of the general formula $[R_1$—O—C(O)CH$_2$CH(SO$_3^-$)C(O)—O—R$_2]$, where each of $R_1$ and $R_2$ is an alkyl group.

The sulfosuccinate salt of the general formula $MA_n$ is an example of a micelle forming salt. The charge director may be substantially free or free of an acid of the general formula HA, where A is as described above. The charge director may comprise micelles of said sulfosuccinate salt enclosing at least some of the nanoparticles. The charge director may comprise at least some nanoparticles having a size of 10 nm or less, in some examples 2 nm or more (e.g. 4-6 nm).

The simple salt may comprise a cation selected from Mg, Ca, Ba, NH$_4$, tert-butyl ammonium, Li$^+$, and Al$^{+3}$, or from any sub-group thereof. In one example, the simple salt is an inorganic salt, for instance, a barium salt. The simple salt may comprise an anion selected from $SO_4^{2-}$, $PO_3^-$, $NO_3^-$, $HPO_4^{2-}$, $CO_3^{2-}$, acetate, trifluoroacetate (TFA), Cl$^-$, Bf, F$^-$, $ClO_4^-$, and $TiO_3^{4-}$, or from any sub-group thereof. In some examples, the simple salt comprises a hydrogen phosphate anion.

The simple salt may be selected from CaCO$_3$, Ba$_2$TiO$_3$, Al$_2$(SO$_4$)$_3$, Al(NO$_3$)$_3$, Ca$_3$(PO$_4$)$_2$, BaSO$_4$, BaHPO$_4$, Ba$_2$(PO$_4$)$_3$, CaSO$_4$, (NH$_4$)$_2$CO$_3$, (NH$_4$)$_2$SO$_4$, NH$_4$OAc, Tert-butyl ammonium bromide, NH$_4$NO$_3$, LiTFA, Al$_2$(SO$_4$)$_3$, LiClO$_4$ and LiBF$_4$, or any sub-group thereof. In one example, the simple salt may be BaHPO$_4$.

In the formula $[R_1$—O—C(O)CH$_2$CH(SO$_3^-$)C(O)—O—R$_2]$, in some examples, each of $R_1$ and $R_2$ is an aliphatic alkyl group. In some examples, each of $R_1$ and $R_2$ independently is a $C_{6-25}$ alkyl. In some examples, said aliphatic alkyl group is linear. In some examples, said aliphatic alkyl group is branched. In some examples, said aliphatic alkyl group includes a linear chain of more than 6 carbon atoms. In some examples, $R_1$ and $R_2$ are the same. In some examples, at least one of $R_1$ and $R_2$ is $C_{13}H_{27}$.

In an electrophotographic composition, the charge director can constitute about 0.001% to 20%, in some examples 0.01 to 20% by weight, in some examples 0.01 to 10% by weight, in some examples 0.01 to 1% by weight of the solids of the electrostatic composition. The charge director can constitute about 0.001 to 0.15% by weight of the solids of the liquid electrophotographic composition, in some examples 0.001 to 0.15%, in some examples 0.001 to 0.02% by weight of the solids of the liquid electrophotographic composition. In some examples, the charge director imparts a negative charge on the electrostatic composition. The particle conductivity may range from 50 to 500 pmho/cm, in some examples from 200-350 pmho/cm.

Carrier Liquid

The carrier liquid for the liquid electrophotographic composition can act as a dispersing medium for the other components in the electrostatic composition. For example, the carrier liquid can comprise or be a hydrocarbon, silicone oil, vegetable oil, etc. The carrier liquid can include, but is not limited to, an insulating, non-polar, non-aqueous liquid that can be used as a medium for toner particles. The carrier liquid can include compounds that have a resistivity in excess of about $10^9$ ohm-cm. The carrier liquid may have a dielectric constant below about 5, in some examples below about 3. The carrier liquid can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the carrier liquids include, but are not limited to, aliphatic hydrocarbons, isoparaffinic compounds, paraffinic compounds, dearomatized hydrocarbon compounds, and the like. In some examples, the carrier liquid is an isoparaffinic liquid. In particular, the carrier liquids can include, but are not limited to liquids sold under the trademarks, Isopar-G™, Isopar-H™, Isopar-L™, Isopar-MT™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

Before printing, the carrier liquid can constitute about 20% to 99.5% by weight of the electrostatic composition, in some examples 50% to 99.5% by weight of the electrostatic composition. Before printing, the carrier liquid may constitute about 40 to 90% by weight of the electrostatic composition. Before printing, the carrier liquid may constitute about 60% to 80% by weight of the electrostatic composition. Before printing, the carrier liquid may constitute about 90% to 99.5% by weight of the electrostatic composition, in some examples 95% to 99% by weight of the electrostatic composition.

The composition when printed on the print substrate, may be substantially free from carrier liquid. In an electrostatic printing process and/or afterwards, the carrier liquid may be removed, e.g. by an electrophoresis processes during printing and/or evaporation, such that substantially just solids are transferred to the print substrate. Substantially free from carrier liquid may indicate that the ink printed on the print substrate contains less than 5 wt % carrier liquid, in some examples, less than 2 wt % carrier liquid, in some examples less than 1 wt % carrier liquid, in some examples less than 0.5 wt % carrier liquid. In some examples, the ink printed on the print substrate is free from carrier liquid.

Colorants

The electrophotographic composition and/or ink printed on the print substrate may further include a colorant. The colorant may be selected from a pigment, dye and a combination thereof. The colorant may be transparent, unicolor or composed of any combination of available colours. The colorant may be selected from a cyan colorant, a yellow colorant, a magenta colorant and a black colorant. The electrophotographic composition and/or ink printed on the print substrate may include a plurality of colorants. The electrophotographic composition and/or ink printed on the print substrate may include a first colorant and second colorant, which are different from one another. Further colorants may also be present with the first and second colorants. The electrophotographic composition and/or ink printed on the print substrate may include first and second colorants where each is independently selected from a cyan colorant, a yellow colorant, a magenta colorant and a black colorant. In some examples, the first colorant includes a black colorant, and the second colorant includes a non-black colorant, for example a colorant selected from a cyan colorant, a yellow colorant and a magenta colorant. The colorant may be selected from a phthalocyanine colorant, an indigold colorant, an indanthrone colorant, a monoazo colorant, a diazo colorant, inorganic salts and complexes, dioxazine colorant, perylene colorant, anthraquinone colorants, and any combination thereof.

Where present, the colorant may be present in an amount of 0.1 to 10 weight %, for instance, 2 to 5 weight % of the total weight of solids of the composition.

In some examples, the electrophotographic composition is devoid of colorant. The electrophotographic composition may be a transparent ink or a varnish composition that is electrophotographically printed over an image formed of an electrophotographic ink.

In one example, the electrophotographic composition is a transparent ink. The transparent ink may be printed beneath or over a visible printed image (e.g. a 2-D image) to provide the desired loft effect. The visible printed image may be printed using any suitable liquid electrophotographic ink composition comprising a colorant.

Production Method

As described above, the present disclosure also relates to a method of producing a liquid electrophotographic composition. The method comprises incorporating the microspheres into a composition comprising a thermoplastic polymer resin, a charge adjuvant, and a liquid carrier.

In some examples, the microspheres are added to a dispersion containing thermoplastic resin particles. These microspheres may develop on an image as a result of drag created as the charged toner particles move in response to an applied voltage.

In some examples, the microspheres are dispersed in molten or softened thermoplastic resin. The molten or softened thermoplastic resin may then be allowed to cool and coat the microspheres. The resulting composition contains composite particles comprising microspheres coated at least in part by the (e.g. acid) thermoplastic polymer resin (see above). The microspheres are intimately in contact with the thermoplastic polymer resin. This allows more microspheres to be loaded in the liquid electrophotographic composition without loss of electrophotographic printing efficacy. In some examples, the microspheres are present at a concentration of greater than 10 weight %, for example, 15 to 90 weight % of the total weight of solids in the electrophotographic composition. Higher microsphere loadings may also allow the desired loft to be achieved in a fewer number of passes. Surprisingly, the present inventors have found that, even when the microspheres are coated by the thermoplastic resin, the microspheres expand upon heating above a threshold temperature. Thus, expansion of the microspheres may not be significantly affected by the additional thermoplastic polymer resin layer surrounding the microsphere shell.

Printing Process

As mentioned above, the present disclosure relates to an electrophotographic printing method comprising electrophotographically printing a liquid electrophotographic composition described above onto a substrate to form a printed image. The electrophotographic printing method may comprise forming a latent electrophotographic image on a surface. The surface may then be contacted with the electrophotographic composition, such that at least some of the electrophotographic composition adheres to the surface to form a developed toner image on the surface. The toner image is then transferred to the substrate, in some examples via an intermediate transfer member.

In some examples, the surface on which the image is formed or developed may be on a rotating member, e.g. in the form of a cylinder. The surface on which the printed image is formed or developed may form part of a photo imaging plate (PIP). The method may involve passing the composition between a stationary electrode and a rotating member, which may be a member having the surface having the (latent) electrostatic image thereon or a member in contact with the surface having the (latent) electrostatic image thereon. A voltage is applied between the stationary electrode and the rotating member, such that particles adhere to the surface of the rotating member. The intermediate transfer member, if present, may be a rotating flexible member, which may be heated.

Where expandable microspheres are present in the liquid electrophotographic composition, the substrate may be heated once printed in order to effect expansion of the microspheres. As discussed above, the printed substrate may be heated above a threshold temperature to cause the microspheres to expand and create loft in the printed ink.

In one example, the printing method comprises electrophotographically printing a visual 2-D image onto a substrate using a liquid electrophotographic ink composition comprising a colorant. A transparent electrophotographic ink composition comprising microspheres may then be printed over the visual image to provide the resulting image with the desired loft.

In another example, the printing method comprises electrophotographically printing transparent electrophotographic ink composition comprising microspheres onto a substrate. A liquid electrophotographic ink composition comprising a colorant may then be printed over the transparent electrophotographic ink to create a visual image. The microspheres may provide the resulting image with the desired loft effect. For example, expandable microspheres in the transparent electrophotographic ink may be expanded by heating once the visual image is printed in order to provide the resulting image with the desired loft.

Print Substrate

The print substrate may be any suitable substrate. The substrate may be any suitable substrate capable of having an image printed thereon. The substrate may include a material selected from an organic or inorganic material. The material may include a natural polymeric material, e.g. cellulose. The material may include a synthetic polymeric material, e.g. a polymer formed from alkylene monomers, including, but not limited to, polyethylene and polypropylene, polyethylene terepthelate (PET) and co-polymers such as styrene-polybutadiene. The polypropylene may, in some examples, be biaxially orientated polypropylene. The material may include a fabric or metal, which may be in sheet form. The metal may be selected from or made from, for instance, aluminium (Al), silver (Ag), tin (Sn), copper (Cu), mixtures thereof. In an example, the substrate includes a cellulosic paper. In an example, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The substrate is, in some examples, a cellulosic print substrate such as paper. The cellulosic print substrate is, in some examples, a coated cellulosic print. In some examples, a primer may be coated onto the print substrate, before the electrostatic composition is printed onto the print substrate.

The substrate may be heat resistant to temperatures of at least 100 degrees C., for example, at least 120 degrees C. In one example, the substrate is heat resistant to temperatures of at least 130 degrees C., for instance above 200 degrees C. An example of a heat resistant substrate includes cellulose substrates that are substantially free of lignin, for example, sold under the trademarks FlexDura®. Other examples include heat resistant polymer films or substrates, for example, having melting temperatures of at least 100 degrees C., for example, at least 120 degrees C. In one example, the melting temperature is at least 130 degrees C., for instance above 200 degrees C.

Applications

As described above, the microspheres in the liquid electrophotographic ink of the present invention may provide printed substrates with a raised or 3-D look and/or feel. This can have many applications, for example, in the printing of articles such as packaging, fabric (T-shirts, other clothing and textiles), wallpaper, signs and labels. The microspheres may also be used to print raised text and braille.

As well as providing visual appeal, the 3-D effect may be used to provide the printed substrate with a desired sensory feel. In one example, the microspheres may be used to provide articles with a roughened or non-slip feel. For instance, the article may be a container (e.g. a cup). A surface of the container may be printed with the electrophotographic composition described in this disclosure. When the container is heated, for example, by the introduction of a hot beverage, the container may be provided with a textured feel giving the container a non-slip surface.

EXAMPLES

Example 1

Paste Formation

Nucrel®925, Nucrel®2806 and Bynel®2022 in pre-determined weight ratio were loaded into a mixer. Iso-paraffin (Isopar-L) was added to this resin mixture to make a paste containing 40 weight % non-volatile solids (NVS). The mixture was heated to 130° C. under constant mixing (100 rpm). After 3 h, the heating was stopped and the mixture was allowed to gradually cool to room temperature under constant mixing. Great care was taken during paste formation to avoid phase separation. Cooling was performed under constant mixing (50 rpm) for at least 12-16 h.

Preparation of Varnish Solids

The paste described above, Isopar-L and charge adjuvant were loaded into an attritor containing metal (or ceramic) grinding balls. The grinding process was performed at 30° C. (mixing speed of 250 rpm) for 12-15 hours. After that, grinding was stopped and a small sample from the ground was taken, dispersed in 0.1% BBP (in isopar-L) and measured by Malvern for particle size distribution. Grinding was terminated when the particle size reached 1 micron or below. The ground mixture was then diluted with Isopar-L, mixed for few hours and transferred to a receiving container. The resulting composition had a NVS content of 10-13 weight %. This composition was diluted further with Isopar-L and charge director added to provide a working dispersion (WD) having an NVS of approximately 2 weight %.

Loading Expancel® Microspheres to the Varnish Ink

In this example, the Expancel® microspheres (25 weight % Expancel® DU 461) were added to the working dispersion and allowed to mix in the shaker (250 rpm) at room temperature for at least 3 hours prior to printing.

Example 2

In this method, Nucrel®925, Nucrel®2806 and Bynel®2022 at pre-determined weight ratio were melted. Iso-paraffin (Isopar-L) was added to this resin mixture to make a paste containing 40 weight % non-volatile solids (NVS) and the mixture was heated with agitation at 140 degrees C. The melt process was carried out slowly over a period of 2 hours. The resulting paste was then cooled at rate of 0.5° C./minute) to 80° C. under constant mixing.

25 wt % Expancel® DU 461 (to total mass) was added under high-shear (10K, rpm) and constant mixing. As high-shear mixing can cause the melt-temperature to rise, care should be taken to avoid allowing the temperature to exceed 80° C. After 30 minutes, the high-shear mixing was stopped and cooling was continued at a rate of 0.1° C./minute under constant mixing. At 60° C., the melt turned into a white paste. The paste was then cooled further to 40° C. at 0.5° C./minute and discharged. Grinding was avoided as this was found to destroy the microspheres and eliminate the expansion effect.

The procedures of Examples 1 and 2 were repeated using the following grades of expandable Expancel® microspheres. 461 DU 40 (PS 9-15 μm, Tstart=98-104° C.), 551 DU 40 (PS 10-16 μm, Tstart=95-100° C.), 461 DU 20 (PS 6-9 μm, Tstart=100-106° C.), 051 DU 40 (PS 9-15 μm, Tstart=108-113° C.), 031 DU 40 (PS 10-16 μm, Tstart=80-95° C.), 053 DU 40 (PS 10-16 μm, Tstart=96-103° C.), and 920 DU 40 (PS 10-16 μm, Tstart=123-133° C.).

Example 3

In this Example, a transparent electrophotographic composition was formed in accordance with the procedure described in relation to the working dispersion of Example 1 except that microspheres were omitted from the composition. The transparent electrophotographic composition was placed in a petri dish. The ink was then heated at 130° C. for 30 minutes to remove the iso-paraffin carrier from the composition. FIG. 1a is a photograph of the transparent layer formed on removal of the carrier.

A transparent electrophotographic composition containing 25 wt % Expancel® DU 461 was prepared according to Example 2 above. The transparent electrophotographic composition was placed in a petri dish. The ink was then heated at 130° C. for 30 minutes. As can be seen from FIG. 1b, the microspheres expand on heating to provide a layer with increased loft.

Example 4

In this specific example, YMCK separations were printed first using commercially available electrophotographic inks followed by 13 separations of the transparent electrophotographic composition containing 25 wt % Expancel® DU 461 prepared according to Example 1 above. The prints were stored at room temperature until further heat treatment. The prints were stable when stored temperatures below 80° C.

Figure 2:
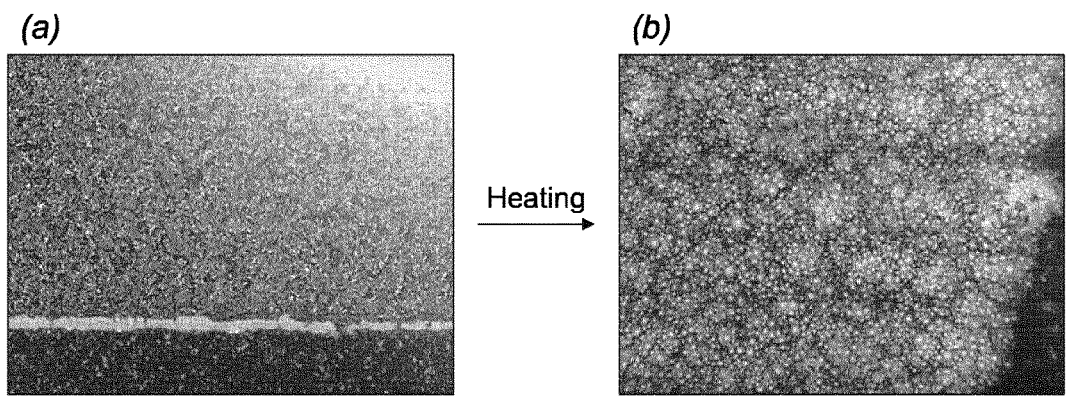
FIGS. 2a and 2b are microscope images of a substrate printed with a transparent electrophotographic composition containing expandable microspheres before and after heating.

FIG. 2 shows is a microscope image of the printed substrate before and after heating to 120° C. for 1 minute. As can be seen, heating results in a dramatic expansion in the size and height of the image. Micrometer measurements showed that 13 separations of the transparent electrophotographic composition measured 15±0.2 microns in thickness before heating. However, after heating, the separations measured 198±2 microns in thickness when the microspheres were fully expanded. This was more than a 10 fold increase in image height.

Figure 3:
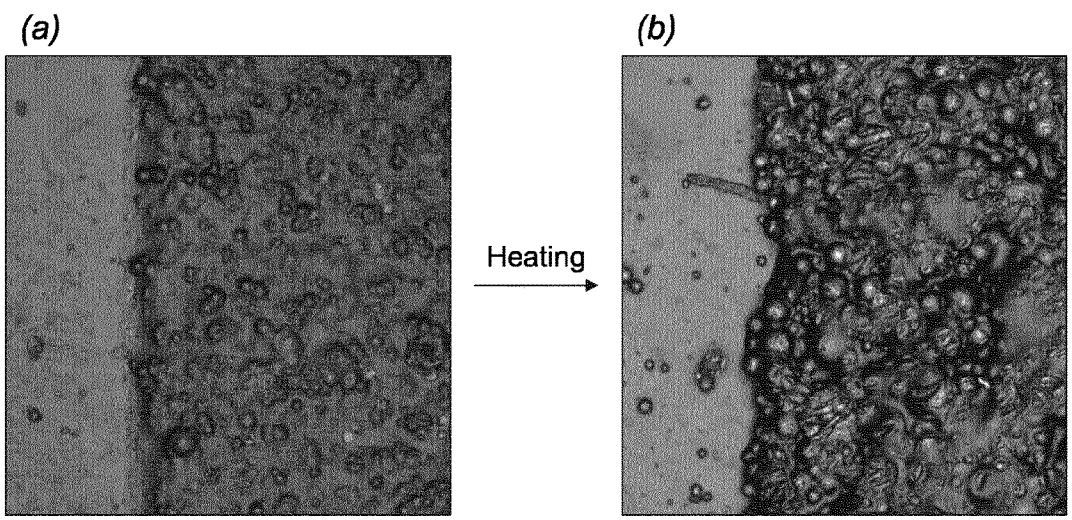
FIGS. 3a and 3b are confocal microscope images of a substrate printed with a transparent electrophotographic composition containing expandable microspheres before and after heating.

FIG. 3 shows a confocal microscope images of prints formed using a transparent electrophotographic composition (containing 25 wt % Expancel® DU 461 prepared according to Example 1) before and after heating. Heating caused a significant expansion in size of the microspheres, causing an increase in thickness of approximately 10 times.

The invention claimed is:

1. A liquid electrophotographic composition comprising:
a thermoplastic polymer resin,
a charge adjuvant,
microspheres, and
a liquid carrier,
wherein each microsphere comprises a shell of material encapsulating a gas, wherein the microspheres are present in an amount of 5 to 90 weight % of the total weight of solids in the composition, and wherein the microspheres are at least partially coated with the thermoplastic polymer resin.

2. The composition as claimed in claim 1, wherein the microspheres are expandable microspheres that expand when the microspheres are heated beyond a threshold temperature.

3. The composition as claimed in claim 2, wherein the threshold temperature is above 80 degrees C.

4. The composition as claimed in claim 1, wherein the microspheres present in the liquid electrophotographic ink composition have an average particle diameter of 6 to 40 microns.

5. The composition as claimed in claim 1, wherein the microspheres comprise a shell of thermoplastic material.

6. The composition as claimed in claim 5, wherein the thermoplastic material is poly(acrylonitrile-co-vinylidene chloride-co-methyl methacrylate.

7. The composition as claimed in claim 1, wherein the thermoplastic polymer resin is selected from at least one of a copolymer of ethylene and methacrylic acid and a copolymer of ethylene and acrylic acid.

8. The composition as claimed in claim 1, wherein the microspheres are present in an amount of 15 to 80 weight % of the total weight of solids in the composition.

9. An electrophotographic printing method comprising:
electrophotographically printing a liquid electrophotographic composition onto a substrate to form a printed image,
wherein the composition comprises a thermoplastic polymer resin, a charge adjuvant, a charge director, microspheres, and a liquid carrier, wherein each microsphere comprises a shell of material encapsulating a gas, wherein the microspheres are present in an amount of 5 to 90 weight % of the total weight of solids in the composition, and wherein the microspheres are at least partially coated with the thermoplastic polymer resin.

10. The method as claimed in claim 9, wherein the microspheres are expandable microspheres that expand when the microspheres are heated beyond a threshold temperature.

11. The method as claimed in claim 10, wherein the liquid electrophotographic composition is printed onto a substrate at a temperature below the threshold temperature and, after printing, the substrate is heated to a temperature above the threshold temperature, thereby expanding the microspheres in the printed image.

12. A method of producing a liquid electrophotographic composition, said method comprising:
dispersing microspheres in molten or softened thermoplastic resin,
allowing the molten or softened thermoplastic resin to cool and at least partially coat the microspheres, and
incorporating the at least partially coated microspheres into a composition comprising a charge adjuvant, and a liquid carrier, and wherein the microspheres each comprise a shell of material encapsulating a gas and are present in an amount of 5 to 90 weight % of the total weight of solids in the composition.

13. The composition as claimed in claim 1, wherein the charge adjuvant is aluminum distearate, aluminum tristearate, aluminum dipalmitate, aluminum tripalmitate, or a combination thereof.

14. The composition as claimed in claim 1, wherein the gas is carbon dioxide.

15. A liquid electrophotographic composition consisting of:
a thermoplastic polymer resin,
a charge director,
a charge adjuvant,
microspheres, and
a liquid carrier,
wherein each microsphere comprises a shell of material encapsulating a gas, and wherein the microspheres are present in an amount of 5 to 90 weight % of the total weight of solids in the composition.

* * * * *